United States Patent
Johnson et al.

(10) Patent No.: US 7,979,412 B2
(45) Date of Patent: Jul. 12, 2011

(54) OBJECT QUERY OVER PREVIOUS QUERY RESULTS

(75) Inventors: Chris D. Johnson, Rochester, MN (US); William Thomas Newport, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 599 days.

(21) Appl. No.: 11/964,271

(22) Filed: Dec. 26, 2007

(65) Prior Publication Data

US 2009/0171892 A1 Jul. 2, 2009

(51) Int. Cl.
*G06F 17/30* (2006.01)
(52) U.S. Cl. ........ 707/706; 707/707; 707/713; 707/722; 707/763; 709/203
(58) Field of Classification Search .......... 707/706–714
See application file for complete search history.

(56) References Cited

U.S. PATENT DOCUMENTS

| | | | |
|---|---|---|---|
| 7,454,413 B2 * | 11/2008 | Lakshminarayanan et al. | 1/1 |
| 7,490,078 B2 * | 2/2009 | Lee et al. | 1/1 |
| 7,529,750 B2 * | 5/2009 | Bair | 1/1 |
| 7,680,781 B1 * | 3/2010 | Wasserman et al. | 1/1 |
| 7,689,551 B2 * | 3/2010 | Dettinger et al. | 1/1 |
| 2001/0051949 A1 * | 12/2001 | Carey et al. | 707/103 R |
| 2003/0236781 A1 * | 12/2003 | Lei et al. | 707/3 |
| 2004/0015489 A1 * | 1/2004 | Anonsen et al. | 707/3 |
| 2005/0114318 A1 * | 5/2005 | Dettinger et al. | 707/3 |
| 2005/0131941 A1 * | 6/2005 | Dettinger et al. | 707/104.1 |
| 2006/0004735 A1 * | 1/2006 | Dettinger et al. | 707/4 |
| 2006/0074873 A1 * | 4/2006 | Dettinger et al. | 707/3 |
| 2006/0224590 A1 * | 10/2006 | Boozer et al. | 707/9 |
| 2006/0294081 A1 * | 12/2006 | Dettinger et al. | 707/3 |
| 2007/0055692 A1 * | 3/2007 | Pizzo et al. | 707/103 R |
| 2007/0136244 A1 * | 6/2007 | MacLaurin et al. | 707/3 |
| 2007/0226203 A1 * | 9/2007 | Adya et al. | 707/4 |
| 2007/0294234 A1 * | 12/2007 | Dettinger et al. | 707/3 |
| 2008/0104133 A1 * | 5/2008 | Chellappa et al. | 707/201 |
| 2008/0168043 A1 * | 7/2008 | Dettinger et al. | 707/4 |
| 2008/0228720 A1 * | 9/2008 | Mukherjee et al. | 707/3 |
| 2008/0256026 A1 * | 10/2008 | Hays | 707/2 |
| 2008/0275844 A1 * | 11/2008 | Buzsaki et al. | 707/3 |
| 2008/0306983 A1 * | 12/2008 | Singh | 707/102 |

* cited by examiner

*Primary Examiner* — Hanh B Thai
(74) *Attorney, Agent, or Firm* — Wood, Herron & Evans, LLP

(57) ABSTRACT

A method, apparatus and program product is provided for querying an object database. In response to performing a first query, a first set of query results is generated from an object database. Metadata associated with and describing the first set of query results is generated. The first query results and the associated metadata are mapped to a results entity. A second set of query results is generated by querying the results entity using query terms from the metadata in response to performing a second query.

20 Claims, 3 Drawing Sheets

40
| ssn (Key) | name | homeAddress | city | ← 42 |
|---|---|---|---|---|
| 123-45-6789 | John Doe | 123 Main Street | Our Town | ⎫ |
| 987-65-4321 | Jane Doe | 11 First Street | Your Town | ⎬ 44 |
| ... | ... | ... | ... | ⎭ |
↑
46
FIG. 2
70
| KEY | DATE | SYMBOL | NAME | BID | ASK | LAST | HIGH |
|---|---|---|---|---|---|---|---|
| 1 | 100029... | ABC | ABC Corp | 8.00 | 8.25 | 7.50 | 8.75 |
| ... | ... | ... | ... | ... | ... | ... | ... |
| 1002 | 100029... | DEF | DEF Corp | 15.00 | 14.75 | 14.75 | 14.75 |
| ... | ... | ... | ... | ... | ... | ... | ... |
| 2415 | 100029... | GHI | GHI Corp | 12.50 | 13.00 | 12.75 | 14.00 |
| ... | ... | ... | ... | ... | ... | ... | ... |
| | | |
|---|---|---|
| ABC | 8.00 | 8.25 |
| DEF | 15.00 | 14.75 |
| GHI | 12.50 | 13.00 |
| ... | ... | ... |
72 {
74
| rowId | symbol | bid | ask |
|---|---|---|---|
| 1 | ABC | 8.00 | 8.25 |
| 2 | DEF | 15.00 | 14.75 |
| 3 | GHI | 12.50 | 13.00 |
| ... | ... | ... | ... |
78 ↙   } 72
76
| DEF | 15.00 | 14.75 |
|---|---|---|
| GHI | 12.50 | 13.00 |
| ... | ... | ... |
} 80
FIG. 4

OBJECT QUERY OVER PREVIOUS QUERY RESULTS

FIELD OF THE INVENTION

The present invention relates to computers and data processing, and more particularly databases and database queries.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. As the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables, and which are typically accessed using a standardized language such as Structured Query Language (SQL), has substantially improved processing efficiency, as well as substantially simplified the creation, organization, and extension of information within a database. Furthermore, significant development efforts have been directed toward query "optimization", whereby the execution of particular searches, or queries, is optimized in an automated manner to minimize the amount of resources required to execute each query. In addition, a reduced reliance on runtime interpretation of queries in favor of increased usage of directly-executable program code has improved query engine performance.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

To assist in reducing the number of times a database is accessed, occasionally it is beneficial to perform further queries on the results of a previous query to further refine the results. Querying of query results is the ability to re-query an existing record set. For example, an application may have an interface that shows all the users in a particular system. A query, similar to "SELECT*FROM users ORDER BY lastName", may be used to generate a set of results, e.g. a set of all users, ordered by last names, which may then be output for use on a web page. The web page may list the alphabet across the top of this output so that a user could click on the letter "J", for instance, to see everyone whose last name starts with "J". The database would then need to be requeried with a query similar to "SELECT*FROM users WHERE lastName LIKE 'j%' ORDER BY lastName".

A downside to using a method such as this is that two separate queries must be sent to the database, generating two complete result sets and consuming the full database resources required to execute two queries, even though the second query returns a subset of the result set that was already returned by the first query. The bandwidth needed for a single query for a single request from a single user may not be a problem, but using these multiple queries on a site that gets thousands or millions of hits a day can be problematic, and put an undue burden on the system trying to handle the extra queries and loads.

One method of reducing the burden would be to query the query results from the initial query rather than performing the second query on the database itself. Performing queries on query results has many benefits. If there is a need to access the same tables multiple times, the access time for modestly sized tables may be greatly reduced because the data may already be in memory, or cached and easily retrieved. Joins and unions may be performed on results from different data sources. For example, a union may be performed on queries from different databases to eliminate duplicates for a mailing list. Cached query results may be efficiently manipulated in different ways. A database may be queried once and then the results of the query may be used to generate several different summary tables. For example, if there is a need to summarize the total salary by department, by skill, and job, one query of the database may be run and the query results used in three separate queries to generate the summaries. Or the results may be used for drill-down, master-detail-like functionality where by using the results, it is not necessary to go to the database for the details. For example, information may be selected about departments and employees in a query and the results cached. The employee names may then be displayed in an application. When a user selects an employee, the application displays the employee details by selecting information from the cached query results without accessing the database.

In recent years, the object-oriented paradigm has been applied to database technology, using a programming model known as object databases. These databases attempt to bring the database world and the application programming world closer together, in particular by ensuring that the database uses the same type system as the application program. This aims to avoid the overhead of converting information between its representation in the database (for example as rows in tables) and its representation in the application program (typically as objects). Object Query Language (OQL) is a query language that is generally a standard for object-oriented databases and is modelled after SQL. This language allows for queries to be performed on objects, generating similar sets of query results, which can then be used in the applications as above. However, while relational databases have included the capability to push query results into temporary tables, object systems like Container Managed Persistence (CMP) and Java Persistence API (JPA), which are part of the Enterprise JavaBeans® Specification, and non-Object systems like JDBC allow data to be queried but the results from the query are second class. In other words, the results are not queryable in the same way as the original data. Unlike temporary tables created from SQL type queries, results objects generated from querying the object database do not contain a full description of the data. The results objects lack the descriptors and key values (metadata) of the original data, necessary for performing a query. In order to perform a query on the results objects, additional APIs or additional configuration must be included, generally through additional programming.

Therefore, there is a need in the art to be able to access and query object query results, in a first class manner, using the same mechanisms used for the original query.

SUMMARY OF THE INVENTION

Embodiments of the invention address the need in the art by providing a method, apparatus and program product for querying an object database. A first query is performed on an object database, generating a first set of query results. Metadata associated with the first set of query results is generated from the first query and then mapped with the first query results to a results entity. Subsequent queries may then be performed on the results entity. The results entity may be any data structure with table-like semantics, though in some embodiments, the entity is a temporary entity table. When generating the metadata, a column may be created in the temporary entity table for a plurality of unique key values associated with individual rows of the first set of query results. In some embodiments, the plurality of unique key values includes an incrementing row Id.

Performing a first query, for some embodiments, includes performing the first query on a server to generate the first set of query results and associated metadata, and then downloading the first set of query results and associated metadata from the server to a client. The temporary entity table may be stored on the client and the second query may also be performed on the client. The temporary entity table may additionally be stored on the server and the second query may then be performed on either the client or the server. In other embodiments, the first and second queries may be part of the same transaction. A first query may be performed by a process to generate the first set of query results and associated metadata. The first set of query results and associated metadata may then be accessed by at least one thread in the process. The temporary entity table may be co-located in the process to be accessible among the threads.

Once the results entity has been created, some embodiments may intermittently re-perform the first query to update the first set of query results and metadata. The results entity may also be joined with another queryable object in the second query to generate the second set of query results. The first set of query results and associated metadata may also be projected to an object using bijection with the second query being performed on the object. In some embodiments, the results entity is stored in a cache.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

FIG. 2 is a representation of a results entity capable of being queried.

FIG. 4 is a flowchart of an exemplary process for performing a query on object query results.

DETAILED DESCRIPTION

Embodiments of the invention address needs in the art by providing a method, apparatus and program product for querying object query results. Embodiments of the invention perform a first query that generates a first set of query results. Metadata associated with the first set of query results from the first query is generated, including in some embodiments a key value to allow for random access of the value data in a results entity. The query results and the associated metadata are then mapped to the entity, which may then be used for subsequent queries without the need for additional APIs or configuration.

Figure 1:
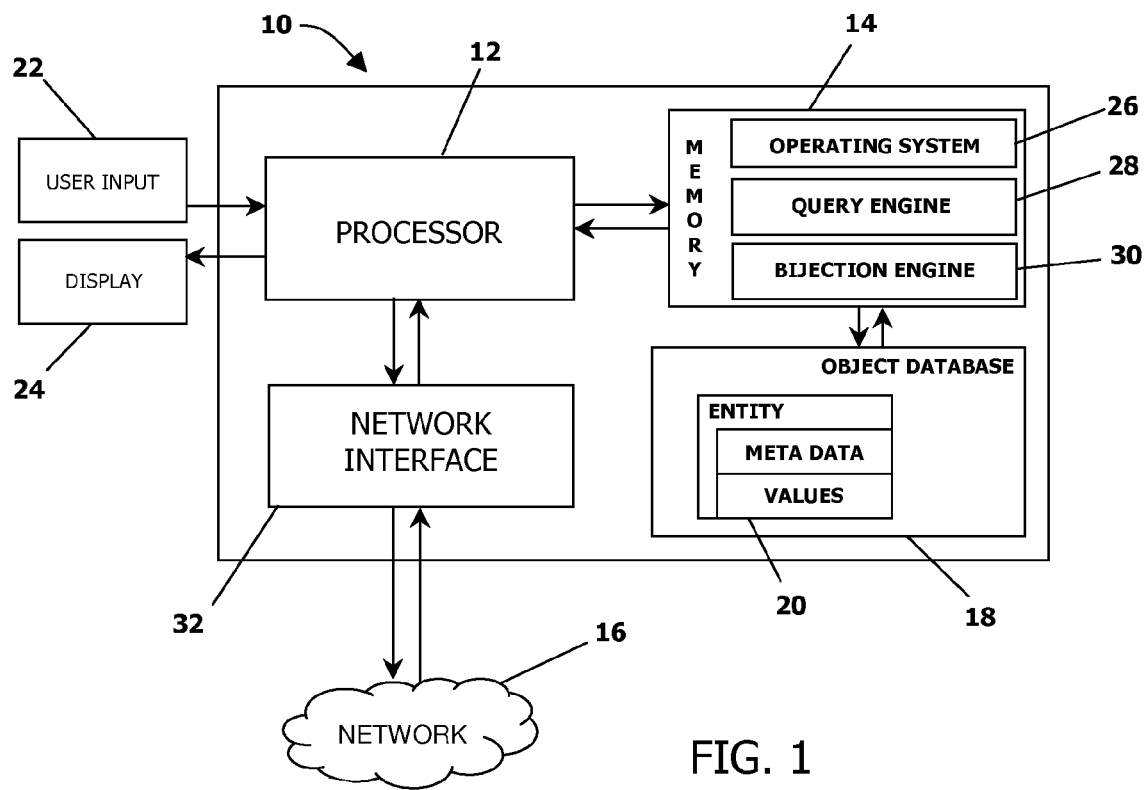
FIG. 1 is a block diagram of an exemplary hardware and software environment for a computer suitable for implementing querying object query results consistent with embodiments of the invention.

Turning now to the drawings, wherein like numbers denote like parts throughout the several views, FIG. 1 illustrates an exemplary hardware and software environment for an apparatus 10 suitable for querying object query results consistent with the invention. For the purposes of the invention, apparatus 10 may represent practically any computer, computer system, or programmable device e.g., multi-user or single-user computers, desktop computers, portable computers and devices, handheld devices, network devices, mobile phones, etc. Apparatus 10 will hereinafter be referred to as a "computer" although it should be appreciated that the term "apparatus" may also include other suitable programmable electronic devices.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device or another computer coupled to computer 10 via a network 16. The mass storage device may contain a cache or object database 18 which may store objects or other entities 20 containing queryable query results.

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, a keypad, a stylus, and/or a microphone, among others). Computer 10 may also include a display 24 (e.g., a CRT monitor, an LCD display panel, and/or a speaker, among others). The interface to computer 10 may also be through an external terminal connected directly or remotely to computer 10, or through another computer communicating with computer 10 via a network 16, modem, or other type of communications device.

Computer 10 operates under the control of an operating system 26, and executes or otherwise relies upon various computer software applications, components, programs, objects, modules, data structures, etc. (e.g., query engine 28 or a bijection engine 30). Application 28, for example, may perform queries on database objects or on entities 20 stored on the object grid 18. Computer 10 communicates on the network 16 through a network interface 32.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

In order to query an object in an object database, a requester must have knowledge of the attributes and relationships of that object. One manner of enabling a requester to obtain such information about an object is to provide the object with metadata capable of being retrieved by the requester, e.g., the persistent attributes that the object has, the relationships the object has with the other objects, and the key for the object. For example, as shown in FIG. 2 and defined below, in an entity class:

```
@Entity
public class Person {
    @Id String ssn;
    @Basic String name;
    @Basic String homeAddress;
    @Basic String city;
}
```

The entity 40 consists of metadata 42, value data 44, and a set of key values 46. In this example, the metadata 42 is defined as: Type=String, name=ssn (associated with key 46); Type=String, name=name (associated with a value 44); Type=String, name=homeAddress, (associated with a value 44); and Type=String, name=city (associated with a value 44). The entity 40 is considered a first class entity, capable of being queried.

Figure 3:
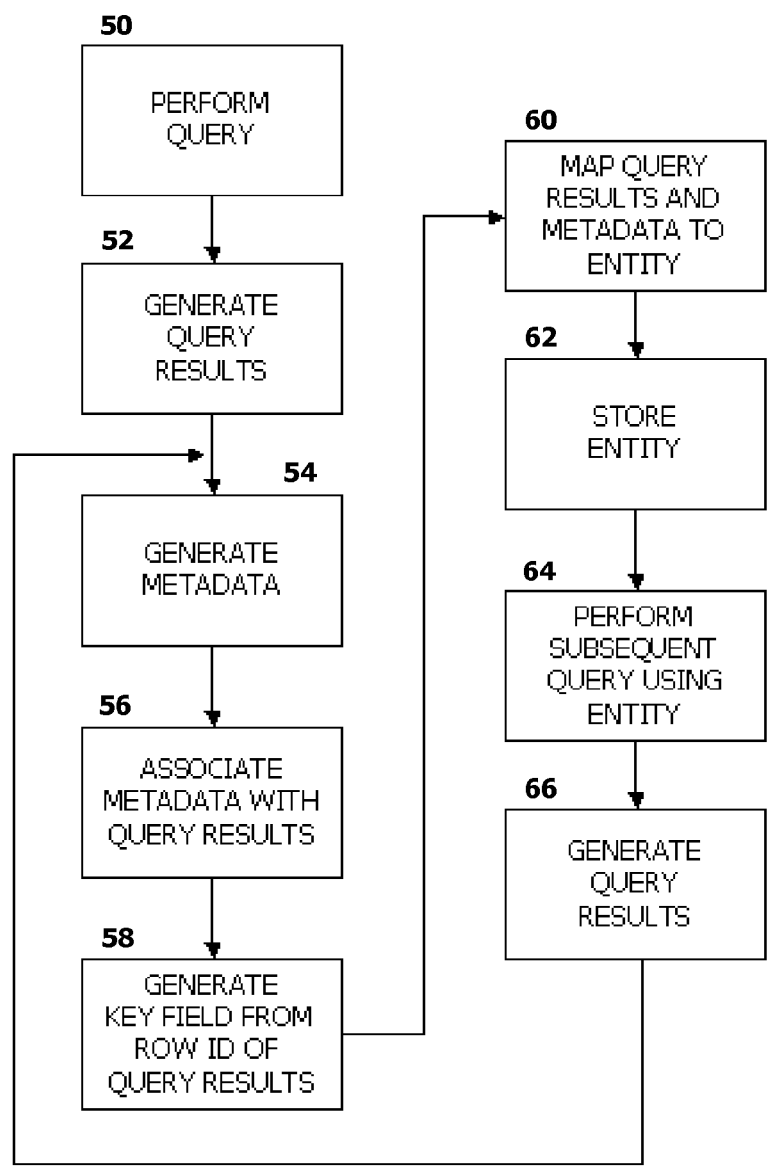
FIG. 3 is a representation of the initial query process to create a queryable entity such as the entity in FIG. 2.

An object database 18, such as IBM's extensible transactional object caching framework, ObjectGrid®, may be configured for storing objects and entities, such as entity 40 above. Referring to the flowchart in FIG. 3, which shows the overall process, when an application runs a query in block 50 against the object database 18, a transaction scoped 'table' may be created for the query results in block 52. It should be understood that term 'table' may include any data structure with table-like semantics, and that the term 'table' is being used here for convenience. Metadata describing the results of the query is extracted in block 54 and is associated with the table in block 56. A first column with a simple increasing integer may be added in some embodiments as an artificial key in block 58. This data is mapped to the table creating a results entity in block 60. The entity may be cached or otherwise stored in block 62. The application may now run subsequent queries against the entity in block 64 in the same or different transaction to find derivative results in block 66. Additional queries may continue to be run against the entity as needed. In some embodiments, the application may also project the results to an object using bijection rather than working with the results in rows and columns as is contemporarily done with object query systems. The actual metadata "values" may not be important other than the query can generate metadata that can be mapped to a results entity allowing the entity to be queried.

A unique aspect of the process described above is that the result of the query is another cached object. This object may then be treated like any other cached object (queried, found, removed, updated, etc.). Applications are then free to use the new results entity as a term or part of new queries just like the original data. This significantly improves the usefulness of the query results and allows complex object queries to be easily built and derived from previous queries.

A graphical illustration of this process may be seen in FIG. 4. For example, if one uses a JPA-like interface and a single transaction, the query describes a new results entity, where the key is the row Id, and the attributes or associates are the elements of the SELECT clause. Referring now to the figure and to the statements below, which are similar to JPA syntax, a query is executed on object 70 selecting the symbol, bid price, and ask price from the object where the date is greater than a set value:

Tran.begin( )
Query q = entityManager.createQuery("SELECT p.symbol, p.bid, p.ask FROM position p WHERE p.date >);

A result name may be identified which sets the name of the new entity 72. This name may also be automatically generated as well.

q. setResultEntityName("ALL_NEW_POSITIONS")

Once a name has been associated with the results 74 and new results entity 72, the results 74 may be retrieved without using the Query Result Entity.

List<Object[ ]>results=q.getResultList( )

A new cached entity named ALL_NEW_POSITIONS has now been created that is scoped to the current transaction and may be used like any normal cached object. The result is an entity so it may be projected onto a compatible Entity class directly from the query results and as seen in FIG. 4:

```
@Entity
    class PositionResults {
        @Id long rowId;
        String symbol;
        Double bid;
        Double ask;
    }
```

Iterator<PositionResults>itPositionResults=q.getResult Iterator(PositionResults.class); PositionResults firstResult=itPositionResults.getNext( );

Here, the metadata 76 associated with the query results and mapped to the entity contains: Type=long, name=rowId (associated with the key 78); Type=string, name=symbol (associated with a result value 74); Type=double, name=bid (associated with a result value 74); and Type=double, name=ask (associated with a result value 74). The key values 78 used for this entity are arbitrarily generated from the row Id of the query results.

The cached entity may now also be found like any other entity in the object database 18:

firstResult=entityManager.find("ALL_NEW_POSITIONS", PositionResults.class, 1); Each entity has the row identifier so it may be randomly accessed. This entity may now also be used to create another query with this cached object using the metadata as the query terms and generating a further refined set of query results 80:

```
Query q2 = entityManager.createQuery("SELECT p.symbol FROM
    ALL_NEW_POSITIONS WHERE p.bid > 10.00");
    q2.getResultList( ) // New postions > 10.00
```

The new query may run locally or may be run on a client in a client/server environment. The entity may also be joined to other cached objects for other subsequent queries.

As discussed above, once the entity has been created, it may be operated on like any other object in the object database 18. In a client-server arrangement, the initial, larger query may be performed on the server and the query result entity may be sent to the client for localized, subsequent query operations. Alternately, all queries may be performed on the server. Larger queries that generate query result entities may be set to run on a regular basis, possibly during off peak access times, to periodically update the query result entities in order to assist in improving the performance and response times of applications.

While all of the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the applicant's general inventive concept.

What is claimed is:

1. A method for querying an object database, the method comprising:
    in response to performing a first query, generating a first set of query results from an object database;
    generating metadata associated with and describing the first set of query results after performing the first query;
    mapping the first query results and the associated metadata to a results entity after performing the first query; and
    in response to performing a second query, generating a second set of query results by querying the results entity using query terms from the metadata,
    wherein generating the first set of query results comprises:
        executing the first query on a server to generate the first set of query results and associated metadata; and
        downloading the first set of query results and associated metadata from the server to a client, and
    wherein the second query is executed and the second set of query results is generated on the client from data that is resident on the client, and wherein the first set of query results is generated from data that is not resident on the client prior to performing the first query.

2. The method of claim 1 wherein using query terms from the metadata in association with performing the second query comprises:
    retrieving metadata from the results entity and generating the query based on the retrieved metadata.

3. The method of claim 1 wherein the results entity includes a data structure with table-like semantics.

4. The method of claim 1 wherein the results entity includes a temporary entity table.

5. The method of claim 4 wherein mapping the first query results and associated metadata to the results entity includes:
    creating a column in the temporary entity table for a plurality of unique key values associated with individual rows of the first set of query results,
    wherein the plurality of unique key values comprises an automatically generated row ID.

6. The method of claim 4 wherein the temporary entity table is stored on the client.

7. The method of claim 6 wherein the temporary entity table is additionally stored on the server and wherein the second set of query results is generated on either the client or the server.

8. The method of claim 4 wherein generating a first set of query results comprises:
    executing the first query by a process to generate the first set of query results and associated metadata; and
    accessing the first set of query results and associated metadata by at least one thread in the process.

9. The method of claim 8 wherein the temporary entity table is co-located in a process.

10. The method of claim 1 further comprising:
    intermittently re-executing the first query to update the first set of query results and metadata.

11. The method of claim 1 wherein the second query joins the results entity with another queryable object to generate the second set of query results.

12. The method of claim 1 wherein the results entity is stored in a cache.

13. The method of claim 1 further comprising:
    projecting the first set of query results and associated metadata to an object using bijection; and
    performing the second query on the object.

14. An apparatus comprising:

a server having a processor; and program code configured to be executed by the server for querying an object database, the program code configured to generate a first set of query results from an object database in response to performing a first query, generate metadata associated with and describing the first set of query results after performing the first query, map the first query results and the associated metadata to a results entity after performing the first query, and download the first set of query results and associated metadata from the server to a client, such that a second set of query results is generated by querying the results entity using query terms from the metadata in response to the client performing a second query, and wherein the second set of query results is generated from data that is resident on the client, and the first set of query results is generated from data that is not resident on the client prior to performing the first query.

15. The apparatus of claim 14 wherein the results entity includes a data structure with table-like semantics.

16. The apparatus of claim 14 wherein the results entity includes a temporary entity table.

17. The apparatus of claim 16 wherein the temporary entity table is stored on the client.

18. The apparatus of claim 17 wherein the temporary entity table is additionally stored on the server and wherein the second set of query results is generated on either the client or the server.

19. A program product, comprising:

a computer recordable type medium; and a program code configured for querying an object database, the program code resident on the computer recordable type medium and configured, upon execution by a processor on a client, to generate a first query to an object database resident on a server and receive from the server a first set of query results generated by querying the object data base and metadata associated with and describing the first set of query results which are mapped with the first set of query results to a results entity, wherein the metadata is generated and mapped to the first set of query results after the first query is performed, and the program code further configured to generate a second set of query results on the client by querying the results entity using query terms from the metadata in response to performing a second query, wherein the second query is executed on the client and the second set of query results is generated from data that is resident on the client, and the first set of query results is generated from data that is not resident on the client prior to performing the first query.

20. The program product of claim 19, wherein the results entity includes a temporary entity table, and wherein the temporary entity table is stored on the client.

* * * * *